Patented July 12, 1932

1,867,231

UNITED STATES PATENT OFFICE

CHARLES S. PALMER, OF EVANSTON, ILLINOIS, ASSIGNOR, BY MESNE ASSIGNMENTS, TO PARKE, DAVIS & COMPANY, OF DETROIT, MICHIGAN, A CORPORATION OF MICHIGAN

UNSYMMETRICAL ARSENO-BENZENE COMPOUNDS

No Drawing. Application filed April 19, 1926. Serial No. 103,155.

This invention relates to unsymmetrical arseno-benzene compounds comprising (A) an aromatic grouping incapable of forming soluble alkali compounds and (B) an aromatic grouping capable of forming soluble alkali compounds, thereby rendering the arseno-compound soluble, one of said aromatic groupings containing a substituted amino-group in which the nitrogen is linked to the benzene nucleus.

As aromatic groupings (A) incapable of forming soluble alkali compounds I may mention animo-phenyl groups in which the amino-groups are substituted by substituted alkyl groups such as $-CH_2.CH_2.OH$, $-CH_2.CH_2.CH_2OH$, $-COCH_3$, $-CH_2.CONH_2$ and $-CH_2.CONR_1R_2$, where $R_1$ and $R_2$ may be any desired radicals.

As aromatic groupings (B) capable of forming soluble alkali compounds I may employ a hydroxyl-substituted phenyl group or the formaldehyde sulfoxylate derivative of an amino-substituted phenyl group or any other aromatic grouping of such basicity that it forms a stable alkali salt which imparts solubility to the whole arseno-compound, notwithstanding the presence in the molecule of the aromatic grouping incapable of forming soluble alkali compounds.

The new compounds may be prepared by reducing a mixture of appropriate arsonic acids. The reduction is preferably carried on in aqueous solutions, with or without the addition of pyridine or hydrochloric acid to insure preservation of a homogeneous solution, at room temperature or lower temperature. It is preferred to use hypophosphorous acid as a reducing agent, but any other suitable reducing agent may be used.

When the reduction is complete, if the arseno-compound has not precipitated by itself, the products may be thrown down, for example, by addition of sodium acetate solution, or pouring the reaction mixture into an excess of concentrated hydrochloric acid. The products are dried in a vacuum or inert atmosphere.

In some cases it is preferred to prepare an unsymmetrical arseno-compound having aromatic groupings incapable of forming stable alkali salts and subsequently to substitute in one of said groupings to give it alkali-salt forming properties. For example, instead of an arsonic acid comprising a benzene ring with acidic groups which would react with alkalis to form stable compounds, I may use arsanilic acid and after reduction with another arsonic acid, I may react upon the amino group with formaldehyde-sulfoxylate to produce an arseno-compound which will dissolve in alkalis. In some cases the reduction and the reaction for the insertion of solubilizing groups may be performed simultaneously. For example, sodium formaldehyde-sulfoxylate may be employed as a reducing agent and for reaction with an amino-group to give a soluble compound.

The products are light yellow powders, readily soluble in dilute aqueous alkali hydroxides or carbonate to give clear, yellow solutions. They oxidize in air and should be preserved in ampules filled with inert gas, suitably carbon dioxide. The new compounds find application in medicine especially in the treatment of diseases caused by trypanosomes or spirochætes.

The invention will readily be understood from the following examples:

*Example 1.*—A fiftieth-mole each of p-arsono-phenylamino ethanol and p-arsono-phenol are dissolved in 30 cc. of water and 10 cc. of 12 N. hydrochloric acid. To the clear solution, cooled to room temperature, is added one-half mole of 50% hypophosphorous acid. A yellow precipitate which begins to appear in a few minutes gradually increases in amount. After three days, 20 cc. more 12 N. hydrochloric acid is added and the product filtered in a current of carbon-dioxide and washed repeatedly with dilute hydrochloric acid. It is dried in vacuo and amounts to a yield of five grams of hydrochloride or 60%. Smaller additional amounts are obtained by allowing the mother liquors to stand. The product is wholly soluble in caustic soda, indicating the absence of p-arseno-phenyl-amino-ethanol. The absence of p-arseno-phenol is proved by analysis. Analysis gives arsenic, 36.2%.

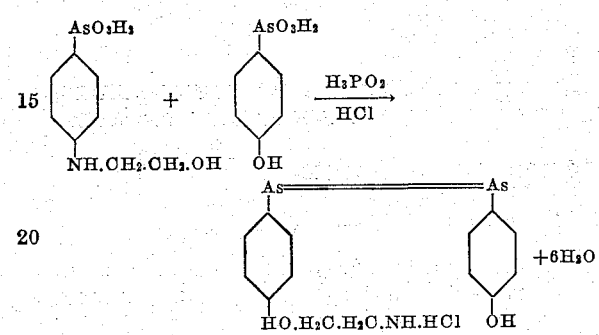

*Example II.*—A solution of a fiftieth-mole each of p-arsono-phenyl-amino-ethanol and arsanilic acid is prepared in 30 cc. of water and 10 cc. 12 N. hydrochloric acid. This is treated with one-half mole of 50% hydrophosphorous acid and allowed to stand at room temperature for a period of three days. No precipitate appears but the solution acquires a clear yellow color. Precipitation is effected by pouring into 100 cc. of rapidly-stirred 6 N. hydrochloric acid. It is easily filtered in the open air without discoloration due to oxidation, washed with dilute hydrochloric acid repeatedly and triturated in methanol to which has been added a small amount of concentrated hydrochloric acid. It is then filtered and dried with ether. Yield, 7 grams or 78%. The product will not dissolve in water except with the addition of a small quantity of hydrochloric acid to check hydrolysis. Analysis gives arsenic 34.1%

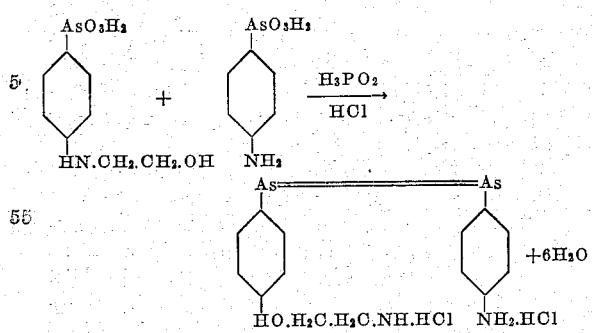

Other hydroxy-alkyl-amino-arsonic acids and other amino-substituted arsonic acids can be employed to make similar compounds.

The formaldehydesulfoxylate derivative of the above compound is prepared by dissolving 5 g. in 50 cc. of water containing 3 cc. 12 N. hydrochloric acid, and adding a solution of 2.5 g. of sodium formaldehydesulfoxylate in 25 cc. of water to it. In a few minutes a yellow precipitate begins to form. The reaction is complete in an hour at room temperature. Filtration is effected in carbon dioxide and after the compound has been thoroughly washed with water, it is rapidly dried by washing with absolute methanol and ether, and then left over night in a vacuum desiccator over sulfuric acid. The yield is quantitative. Analysis gives arsenic 29.0% and sulfur 8.2%. The product is soluble in sodium hydroxide and sodium carbonate.

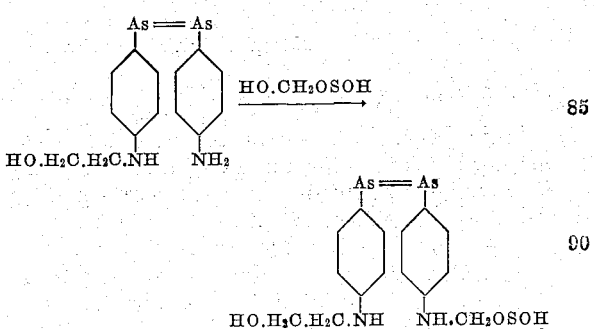

*Example III.*—The procedure of Examples I and II is followed in the case of p-arsono-phenyl-amino-ethanol and 3-amino-4-hydroxy-phenyl-arsonic acid. After reduction, the clear yellow solution is thrown into a mixture of 100 cc. 12 N. hydrochloric acid and 100 cc. water. A yellow gum is formed that is taken up in 100 cc. of water, which may contain a small amount of hydrochloric acid to check hydrolysis. The clear solution is then poured into 100 cc. of concentrated hydrochloric acid and by this means an easily handled precipitate is obtained that filters well and can be washed with 6N.HCl and a mixture of equal volumes of methanol and ether. It is dried in vacuo. Analysis arsenic 32.2% and chlorine 15.1%.

Similar compounds can be prepared from other amino-hydroxy-arsonic acids and other hydroxy-alkyl-amino-arsonic acids in which either one or both hydrogens of the amine have been substituted by —$CH_2CH_2OH$, —$CH_2CH_2CH_2OH$, —$CH_2CHOHCH_2OH$, etc.

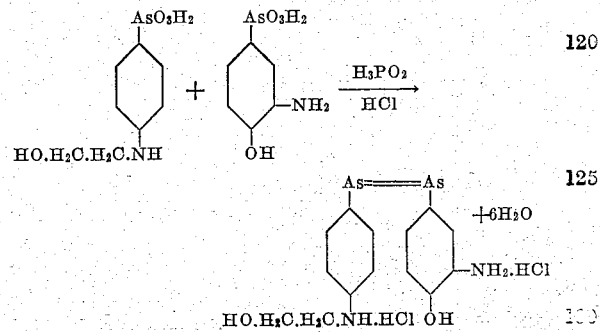

The product readily yields formaldehyde sulfoxylate and sodium formaldehyde bisulfite derivatives which are readily capable of forming soluble alkali compounds. One example of such compounds is the following:

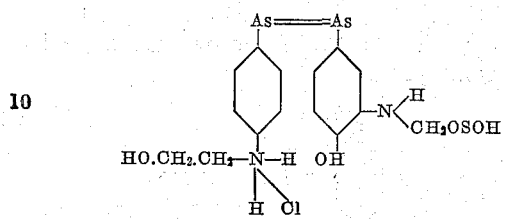

*Example IV.*—For preparing the unsymmetrical compound, 3-amino-4-hydroxy-arseno-benzene-4'-glycineamide, the procedure as given in Examples I and II is varied somewhat. A fiftieth mole each of 3-amino-4-hydroxyphenyl-arsonic acid and p-arsono-phenyl-glycineamide are dissolved in a mixture of 30 cc. of water and 25 cc. of 12 N. hydrochloric acid. To the clear filtered solution is added one half mole of hypophosphorous acid and the reaction mixture left to stand in a cool place, preferably below 15° C. The reduction is allowed to continue over a three-day period, after which time the material is poured into 200 cc. of 6 N. hydrochloric acid. If the latter is rapidly stirred during the addition, the precipitate will come out in an easily filtered form. It is washed with dilute hydrochloric acid and then triturated in a mixture of 50 parts methanol and 50 parts ether. It is dried in vacuo over sulfuric acid. Yield, 6.5 grams or 67.7%. Analysis gives arsenic 34.2%. The product is the mono-hydrochloride.

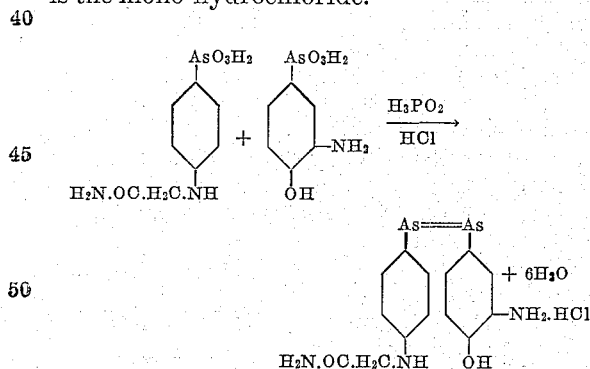

The product readily yields formaldehyde sulfoxylate and sodium formaldehyde bisulfite derivatives which are readily capable of forming soluble alkali compounds.

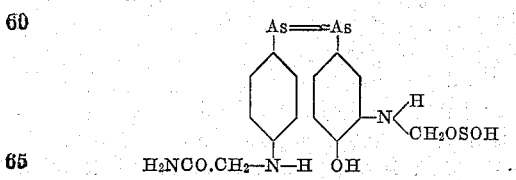

*Example V.*—P-arsono-phenol- and p-arsono-phenyl-glycineamide can be reduced simultaneously to the unsymmetrical arseno-compound by the foregoing method with slight modifications. After twenty-four hours following the addition of the reducing-agent, a yellow precipitate will have settled out that can be filtered readily, washed with dilute hydrochloric acid, alcohol and ether to an almost dry solid. It is dried over sulfuric acid in vacuo. Yield, 6 g. or 71%. Analysis gives arsenic 33.9%.

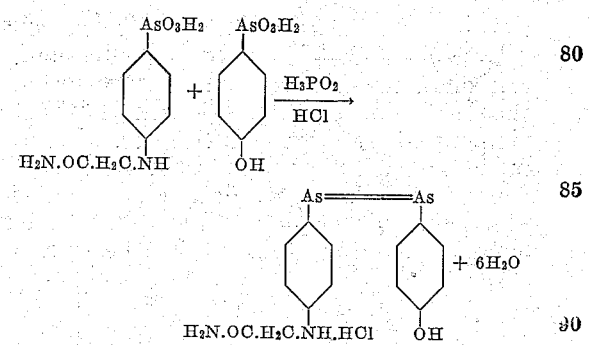

Compounds similar to those described in Examples IV and V may be made in which the hydrogens attached to the nitrogen of the amide group are substituted by one or two organic radicals.

*Example VI.*—Unsymmetrical arseno-derivative of p-arsono-phenoxy-acetic acid and p-hydroxy-ethyl-arsanilic acid. If these two arsonic acids are reduced simultaneously in hydrochloric acid solution by means of hypophosphorous acid, there may result a precipitate of the symmetrical p-arseno-phenoxy-acetic acid. To avoid this possibility, the hydroxy-ethyl-arsanilic acid is reduced first. One-fiftieth mole is dissolved in 15 cc. of water and 5 cc. of concentrated hydrochloric acid ($d=1.19$) and to the clear, filtered solution is added one-quarter mole of 50 per cent. hypophosphorous acid. The mixture is allowed to stand three days when it will have acquired a deep golden yellow tint. Then is added a solution of one-fiftieth mole of p-arsono-phenoxy-acetic acid in 15 cc. of water and 20 cc. concentrated hydrochloric acid ($d=1.19$). The mixture is filtered if necessary and treated with another quarter mole of 50 per cent. hypophosphorous acid. The whole is allowed to stand at room temperature over night, but before filtering is warmed to 60° to dissolve any crystals of unreduced p-arsono-phenoxyacetic acid and maintained at that temperature 10 minutes. The solid yellow precipitate is then filtered in a current of $CO_2$ (if the material is to be used for therapeutic purposes) and washed repeatedly with distilled water, absolute methanol and ether. It is dried in a vacuum desiccator over sulfuric acid. Yield = 68.7 per cent.

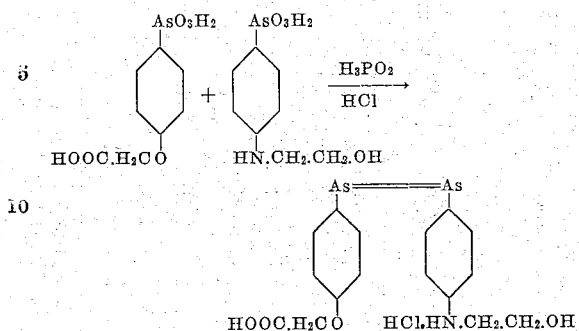

*Example VII.*—Simultaneous reduction of p-arsono-phenyl-glycine and p-arsono-phenyl-glycineamide. Fiftieth moles of both compounds are dissolved in 30 cc. of water and 25 cc. concentrated hydrochloric acid and cooled to 15° C. To the clear solution is then added one-quarter mole of hypophosphorous acid similarly cooled to 15° C. The whole is now cooled to 0° to –5° C. and maintained at that temperature 16 hours after which time it will have acquired a decided yellowish tinge. Also, some of the original material will have crystallized out unchanged. The flask is gently warmed on a water-bath to a temperature not in excess of 45° C. The crystallized material redissolves and the yellow color deepens. Test samples are taken from time to time and made alkaline to determine whether or not any unreduced arsonic acids are still present. When these tests become negative, which requires only a few minutes time, the flask is cooled rapidly to prevent destruction of the somewhat sensitive molecule now present. Precipitation of the compound is brought about by adding 40 grams of sodium bicarbonate. It precipitates in a form that can be easily handled on the filter, and after repeated washings with distilled water, is dried almost completely with methanol followed by ether. The compound is a yellow powder soluble in both hydrochloric acid, alkalies and alkali carbonates. Yield 67%.

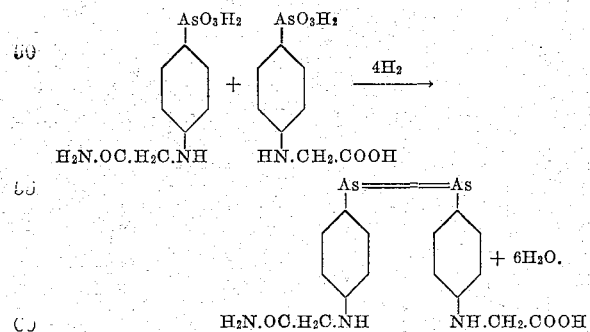

*Example VIII.*—Simultaneous reduction of 4-arsono-phenyl-glycineamide and arsanilic acid with sodium formaldehyde-sulfoxylate. A fiftieth mole of each of the two arsonic acids is dissolved in 30 cc. of water and 20 cc. hydrochloric acid (D=1.19). A second solution is prepared of one-tenth mole of sodium-formaldehyde-sulfoxylate in 50 cc. of water, and added to the first. A yellow precipitate begins to form immediately that increases in volume over a week's time to give a yield of 19%. It is the bismethylene-sulfoxylic acid derivative of the unsymmetrical arseno compound.

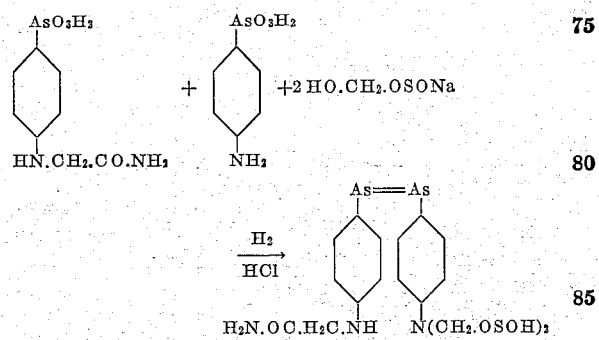

It is to be understood that the invention is not limited to the foregoing examples since they are illustrations of a large class of substances which I intend to be broadly protected within the scope of the appended claims.

While in the foregoing description I have described the production of the new products by a simultaneous reduction of two different acids, they may also be prepared by simultaneous reduction of two different arsine oxides or arsine dihalides or an arsine dihalide and an arsine oxide, or by a rearrangement of two different symmetrical arseno-compounds in solution, or by the action of a primary arsine on primary arsine oxide or dihalide or by substitution on one side only of the arseno-linkage in a symmetrical arseno-compound, or by oxidation of two different arsines.

I claim:

1. An unsymmetrical arseno-compound capable of forming soluble alkali compounds, comprising an aromatic grouping containing a substituted amino-group and incapable of forming stable alkali compounds and an aromatic grouping capable of forming stable alkali compounds.

2. An unsymmetrical arseno-compound capable of forming soluble alkali compounds, comprising an aromatic grouping containing a substituted amino-group and incapable of forming stable alkali compounds and an aromatic grouping containing a substituted acidic group.

3. An unsymmetrical arseno-compound capable of forming soluble alkali compounds, comprising an aromatic grouping incapable of forming stable alkali compounds and an aromatic grouping containing a substituted carboxylic acid group.

4. An unsymmetrical arseno-compound capable of forming soluble alkali compounds, comprising an aromatic grouping containing a substituted amino-group, and incapable of forming stable alkali compounds and an aromatic grouping containing a carboxylic acid group.

5. An unsymmetrical arseno-compound capable of forming soluble alkali compounds, comprising an aromatic grouping incapable of forming soluble alkali compounds and an amino-substituted phenyl group, a carboxylic acid group being substituted in the amino-group.

6. An unsymmetrical arseno-compound capable of forming soluble alkali compounds, comprising an aromatic grouping containing a substituted amino-grouping and incapable of forming soluble alkali compounds and an amino-substituted phenyl group, a carboxylic acid group being substituted in the amino-group.

7. An unsymmetrical arseno-compound capable of forming soluble alkali compounds, comprising an aromatic grouping incapable of forming soluble alkali compounds and a phenyl glycine group.

8. An unsymmetrical arseno-compound capable of forming soluble alkali compounds, comprising an aromatic grouping containing a substituted amino-group and incapable of forming alkali compounds and a phenyl glycine group.

9. An unsymmetrical arseno-compound capable of forming soluble alkali compounds, comprising an aromatic grouping incapable of forming stable alkali compounds and including an amino-group, in which is substituted a substituted alkyl group not capable of forming stable alkali compounds and an aromatic grouping capable of forming stable alkali compounds.

10. An unsymmetrical arseno-compound capable of forming soluble alkali compounds, corresponding to the formula

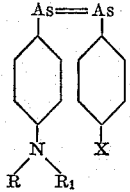

where R and $R_1$ are groups non-solubilizing to alkali at least one being an alkyl grouping and X is an alkali solubilizing group.

11. An unsymmetrical arseno-compound capable of forming soluble alkali compounds, corresponding to the formula

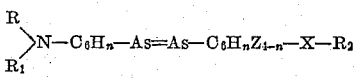

where R and $R_1$ are groups non-solubilizing to alkali, at least one containing an alkyl grouping, X is a divalent group from the class including $-NH-$ and $-O-$, $R_2$ is a monovalent radical containing an alkali-solubilizing group and Z is a monovalent radical from the group consisting of $-H$, and other mono-valent groups.

12. An unsymmetrical arseno-compound capable of forming soluble alkali compounds, corresponding to the formula

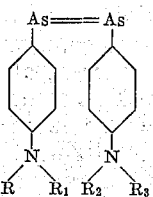

where R and $R_1$, are groups non-solubilizing to alkali at least one being an alkyl grouping and $R_2$ or $R_3$ groups of which at least one is an alkali solubilizing group.

13. An unsymmetrical arseno-compound capable of forming soluble alkali compounds, corresponding to the formula

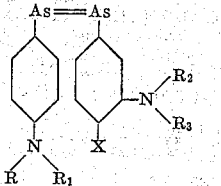

where R and $R_1$ are groups non-solubilizing to alkali and X and one of the groups $R_2$ and $R_3$ are alkali solubilizing groups.

14. An unsymmetrical arseno-compound capable of forming soluble alkali compounds, corresponding to the formula.

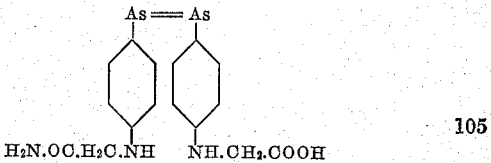

15. An unsymmetrical arseno-compound capable of forming soluble alkali compounds, corresponding to the formula

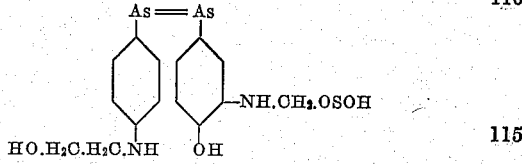

16. An unsymmetrical arseno-compound capable of forming soluble alkali compounds, corresponding to the formula

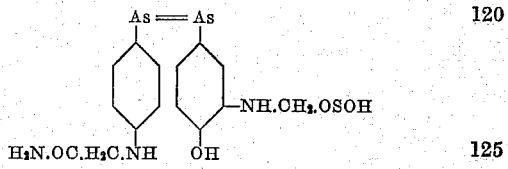

17. An unsymmetrical aromatic arseno-compound in which there is an $-As=As-$ linking, a hydroxy-phenyl group being bonded to one As and a hydroxy-alkyl-amino phenyl group being bonded to the other As.

18. An unsymmetrical aromatic arseno-compound in which there is an —As=As— linkage, a hydroxy-amino-phenyl group being bonded to one As and a hydroxy-alkyl-amino phenyl group being bonded to the other As.

19. The method of forming unsymmetrical alkali soluble arseno-compounds which comprises the treatment with aldehyde sulfoxylate of two dissimilar aromatic arsenic compounds, one of which includes an aromatic grouping non-solubilizing to alkali and the other includes an amino-group thereby simultaneously substituting in said amino-group a solubilizing aldehyde sulfoxylate group and condensing by reduction of the two arsenic compounds into a single unsymmetrical compound.

20. An unsymmetrical arseno-compound capable of forming soluble alkali compounds comprising an aromatic grouping incapable of forming stable alkali compounds and an aromatic grouping capable of forming stable alkali compounds, one of said aromatic groupings containing a substituted amino-group.

CHARLES S. PALMER.